United States Patent
Hughes

(10) Patent No.: US 7,330,943 B2
(45) Date of Patent: Feb. 12, 2008

(54) STORAGE DEVICE FLOW CONTROL

(75) Inventor: Brian W. Hughes, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 11/079,548

(22) Filed: Mar. 11, 2005

(65) Prior Publication Data

US 2006/0031644 A1   Feb. 9, 2006

Related U.S. Application Data

(60) Provisional application No. 60/598,814, filed on Aug. 3, 2004.

(51) Int. Cl.
G06F 12/00 (2006.01)
G06F 13/00 (2006.01)
G06F 13/28 (2006.01)

(52) U.S. Cl. .................. 711/154; 710/57

(58) Field of Classification Search .......... 710/57; 711/154
See application file for complete search history.

(56) References Cited

OTHER PUBLICATIONS

U.S. Appl. No. 60/572,271, filed May 17, 2004 for "Storage Device Flow Control" of Brian W. Hughes.
U.S. Appl. No. 11/032,769, filed Jan. 10, 2005 for "Storage Device Flow Control" of Brian W. Hughes.

*Primary Examiner*—Matthew Kim
*Assistant Examiner*—Edward J Dudek

(57) ABSTRACT

A method for calculating flow control credits includes determining a number of entries added to each of a pair of storage devices, determining a number of entries removed from each of the storage devices, calculating a difference between available space in the storage devices, and calculating a number of credits to release based on the numbers of entries added to each of the storage devices, on the numbers of entries removed from each of the storage devices, and on the difference in available space. Entries removed from one storage device are treated as an entry added to the other storage device.

26 Claims, 8 Drawing Sheets

STORAGE DEVICE FLOW CONTROL

This application claims the benefit of U.S. Provisional Application No. 60/598,814, filed Aug. 3, 2004, for STORAGE DEVICE FLOW CONTROL of Brian W. Hughes which is hereby incorporated by reference for all that is disclosed therein.

BACKGROUND

Most modern electronic devices contain memory for storing data either temporarily or long-term, such as televisions that store the last channel viewed, cellular telephones that store telephone numbers and information about incoming calls, etc. A wide variety of memory systems are known, such as random-access memories and stack-type memories. Each type of memory system has strengths and weaknesses and is used in different types of applications. For example, random-access memories are commonly used when a great deal of storage space is required and each piece of data must be individually accessible at any time. A random-access memory requires relatively complex addressing circuitry, enabling each piece of data to be addressed and retrieved at any time, in any order.

For other applications, simpler memory systems may be acceptable or desirable. One such memory system is a stack-type memory, in which data is sequentially stored in a list and retrieved in a predetermined order, rather than each piece of data being individually addressable and accessible at any time. As data is written into the stack-type memory, it fills the memory as if adding to a stack or pile of data. As data is read out of the stack-type memory, it empties the memory as if removing items from the stack, leaving room for more data to be written. A typical stack-type memory is a first-in first-out (FIFO) memory, in which the first piece of data written to an input of the FIFO will be the first piece of data read back from an output of the FIFO. A common application for stack-type memory systems is as a communications buffer between two electronic circuits. If the first electronic circuit sends a stream of data to the second electronic circuit, the second typically must temporarily store or buffer the data as it arrives, until it is ready to use the data. If the second electronic circuit uses the data in the order in which it is received, there is typically no need to randomly access the pieces of data in any other order, and a FIFO is a simple and inexpensive storage device fitting these requirements.

One disadvantage of a stack-type memory is that it can overflow and lose data if it continues to receive data after becoming full, before any data is read from the memory to free up space.

SUMMARY

An exemplary embodiment may comprise a method for calculating flow control credits, including determining a number of entries added to each of a pair of storage devices, determining a number of entries removed from each of the storage devices, calculating a difference between available space in the storage devices, and calculating a number of credits to release based on the numbers of entries added to each of the storage devices, on the numbers of entries removed from each of the storage devices, and on the difference in available space. Entries removed from one storage device are treated as an entry added to the other storage device.

BRIEF DESCRIPTION OF THE DRAWINGS

Illustrative embodiments are shown in the accompanying drawings as described below.

DESCRIPTION

Figure 1:
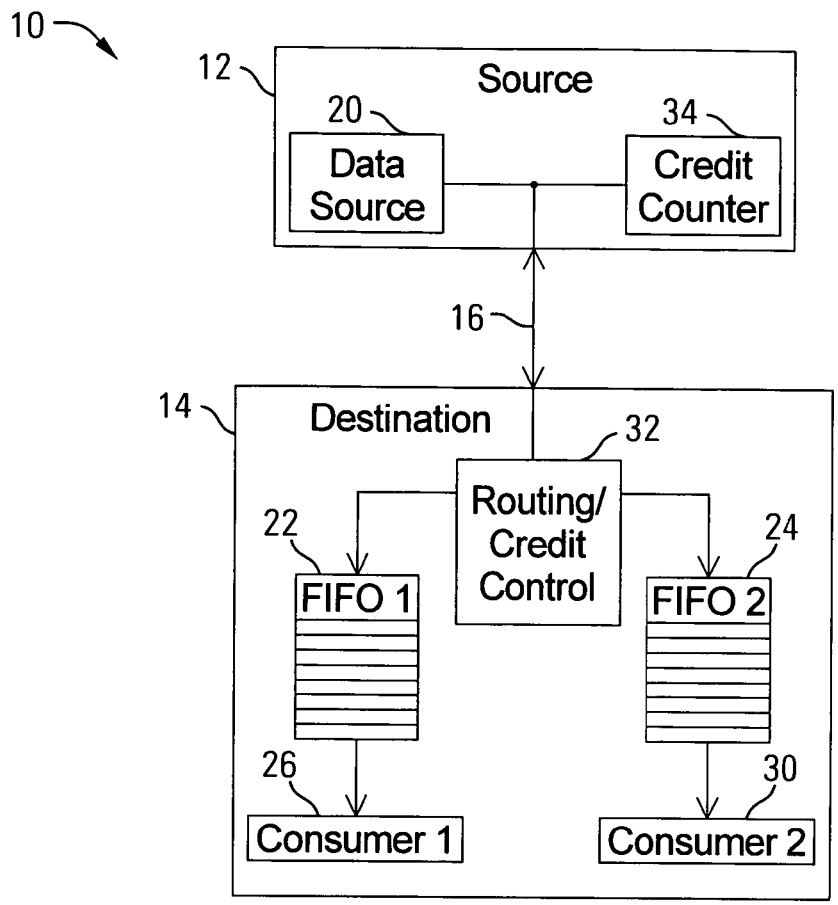
FIG. 1 is a block diagram of an exemplary source and destination illustrating data flow to and from a pair of storage devices.

The drawing and description, in general, disclose a method and apparatus for controlling the flow of data to a pair of storage devices. In one exemplary embodiment, the pair of storage devices comprise stack-type memories such as first-in first-out (FIFO) memories. A credit counter contains the number of credits representing empty spaces or slots in the storage devices. Data is stored in the storage devices only if the credit counter contains sufficient credits, thereby preventing the storage devices from overflowing and discarding data. As new entries are added to the storage devices, the credit counter is decremented, and as entries are removed from the storage devices, the credit counter is incremented as will be described below.

An exemplary system 10 containing such a credit counter and pair of storage devices is illustrated in FIG. 1. Data is transmitted between a source 12 and a destination 14 over any suitable type of connection 16, such as a direct cable connection, network connection, wireless connection, etc. The source 12 contains a data source 20, from which data is sent to a pair of storage devices 22 and 24 in the destination 14. The destination 14 contains two consumers 26 and 30 for the data transmitted from the source 12. This data is buffered for the two consumers 26 and 30 by the pair of storage devices 22 and 24. In one exemplary embodiment, the pair of storage devices 22 and 24 comprise first-in-first-out (FIFO) memories. The general term "storage device" is therefore used somewhat interchangeably herein with the more specific term "FIFO". However, it is important to note that the storage devices are not limited to any specific types or configurations, such as FIFOS.

Data from the source 12 is directed to the appropriate storage device, either FIFO 1 22 or FIFO 2 24, corresponding to the destination consumer 26 or 30, by a router 32. This function may be performed in any suitable manner, at least partly dependent upon the type of connection 16 and architecture in the system 10. For example, data may be transferred from the source 12 to the destination 14 using a bus architecture in which data packets include header information identifying the destination consumer 26 or 30. The router 32 also includes a credit controller, to be described in detail below, for controlling the contents of a credit counter 34 in the source 12. The data connections to and from the FIFOS 22 and 24 may pass through the router/credit controller 32 or may connect directly to the source 12 via connection 16 and to the consumers 26 and 30, as long as the router/credit controller 32 receives the information needed to update the credit counter 34, such as the number of entries written to and read from each FIFO 22 and 24, as will be discussed in detail below.

In the exemplary embodiment, the source 12 is unaware of many details about the memory in the destination 14, including whether it contains one or more storage devices, the type of storage devices, etc. The credit counter 34 enables the source 12 to track the amount of free space in the destination 14. It is initialized with the amount of available storage space in the destination 14 in any suitable manner. For example, the credit counter 34 may be hard-coded with the available storage space in the destination 14, or the router/credit control device 32 in the destination 14 may transmit an indication of the amount of available storage space to initialize the credit counter 34.

In the exemplary embodiment, data is divided into blocks, referred to herein as entries, each of which requires one credit to store in the destination 14. The entries have the same width or number of bits as the FIFOS 22 and 24, so each entry fits into one empty slot in the FIFOS 22 or 24. However, the method and apparatus for controlling the flow of data to a pair of storage devices is not limited to this configuration, and may be adapted to any suitable division of data, as long as a fixed ratio may be established between credits and whatever unit of data is selected, or if the relationship between entries and credits may be otherwise established.

During operation of the system 10, data entries may only be transmitted from the source 12 to the destination 14 if sufficient credits are available in the credit counter 34 for each data item. As data entries are removed from the FIFOS 22 and 24, the number of credits is generally increased in the credit counter 34, as will be described in detail below, allowing more new data entries to be written to the FIFOS 22 and 24.

If the destination 14 contained only one FIFO, controlling data flow with the credit counter 34 would be relatively simple, because every entry transmitted would use one credit and every entry read by a consumer 26 or 30 would release one credit. However, in the system 10 having a pair of FIFOS 22 and 24, not all data entries from the source 12 use a credit. This is because the credit counter 34 is initialized only with the available storage space of one of the pair of FIFOS 22 and 24 in the destination 14, and the FIFOS 22 and 24 do not necessarily fill evenly. Therefore, entries that overlap in corresponding slots in the FIFOS 22 and 24 do not use credits, and therefore do not release credits when removed from the FIFOS 22 and 24.

Because the source 12 is not aware that the destination 14 contains a pair of FIFOS 22 and 24, the credit counter 34 is initialized with the available space of only one FIFO (e.g. 22). If the FIFOS 22 and 24 have different capacities, the credit counter 34 is initialized with the available space of the smaller of the two. If the credit counter 34 were initialized with the available space of both FIFOS 22 and 24 combined, and all or most entries were stored in one of the FIFOS (e.g., 22), that FIFO (e.g., 22) would overflow and data would be lost. Similarly, if the FIFOS 22 and 24 have different capacities, and the credit counter 34 were initialized with the available space of the larger of the two (e.g,. 24), and all or most entries were stored in the smaller (e.g., 24), the smaller FIFO (e.g., 24) would likely overflow and data would be lost.

Figure 2A:
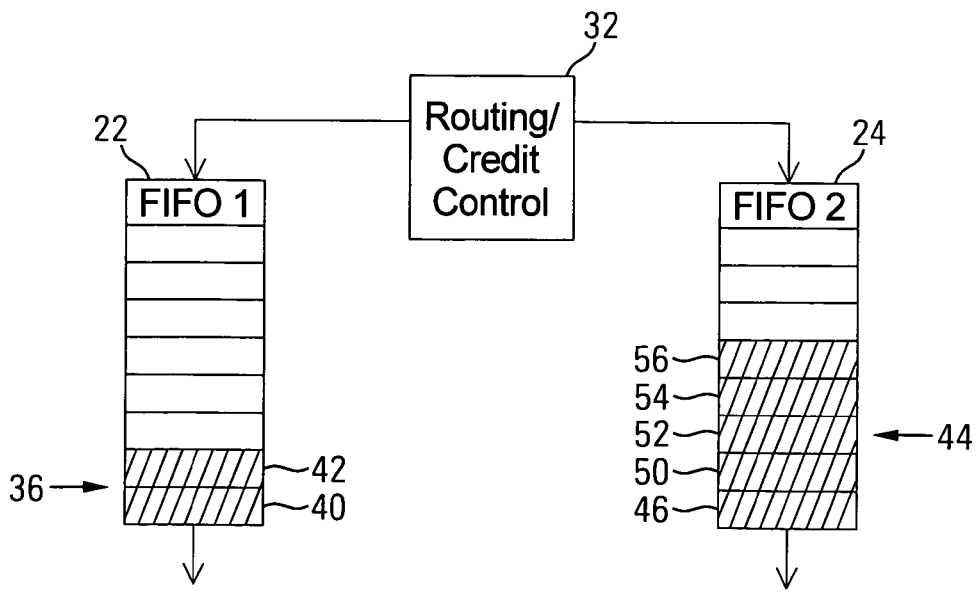
FIGS. 2A-2C are block diagrams of a portion of the exemplary destination of FIG. 1 illustrating existing data entries in the pair of storage devices, new entries added to the pair of storage devices and entries removed from the pair of storage devices.
Figure 2B:
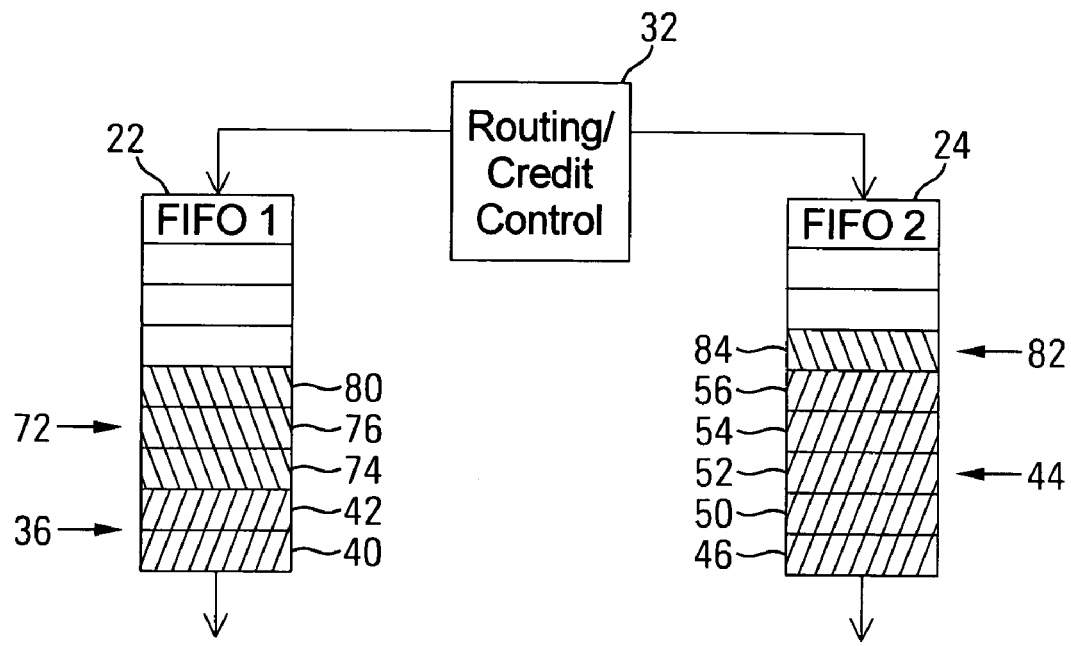
Figure 2C:
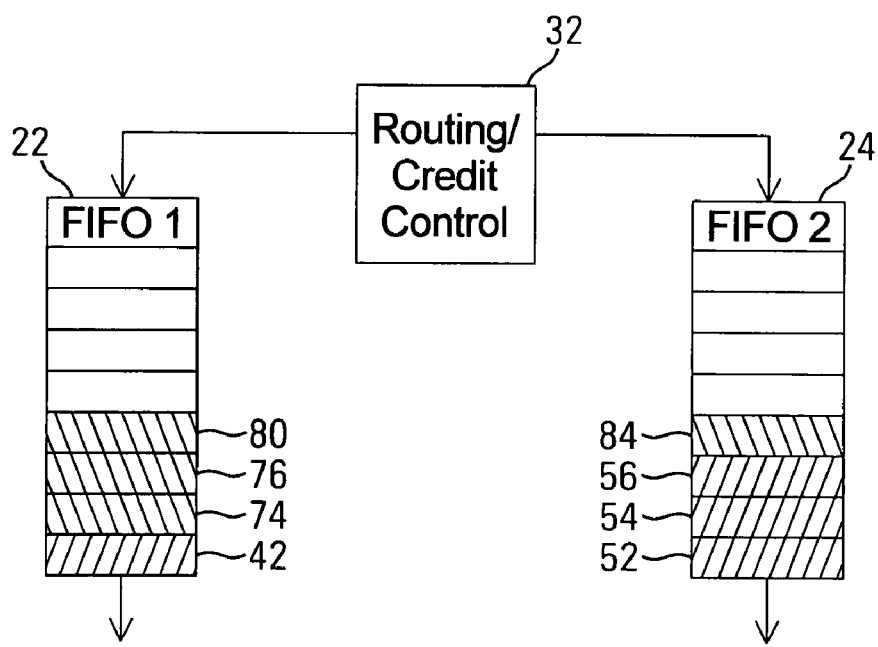

This may be best understood with reference to the exemplary entries illustrated in FIGS. 2A-2C, in which both FIFOS 22 and 24 have eight slots each. The credit counter 34 is therefore originally initialized with a value of eight. Referring now to FIG. 2A, both FIFO 1 22 and FIFO 2 24 contain existing entries 36 and 44, respectively, before new entries are written and entries are read and removed. FIFO 1 22 contains two existing entries 40 and 42, and FIFO 2 24 contains five existing entries 46, 50, 52, 54 and 56. At this point, the credit counter 36 would contain a value of three, the remaining available space in the FIFO 24 that has the least remaining space, or is fullest.

Referring now to FIG. 2B, the process of correctly setting the credit counter 34 will now be explained with respect to a group of new entries 72 and 82. The router/credit controller 32 directs three of the new entries 74, 76 and 80 to FIFO 1 22. However, because FIFO 2 24 is already as full as these new entries 74, 76 and 80 make FIFO 1 22, these new entries 74, 76 and 80 do not use any credits from the credit counter 34. If four credits were removed from the credit counter 34, three credits should be returned to the credit counter 34, corresponding to the entries 74, 76 and 80. The router/credit controller 32 directs the fourth 84 of the new entries to FIFO 2 24. Because this storage device has less remaining space, this entry 84 does use a credit, so the fourth credit is not returned to the credit counter 34. Two credits would now be available, which is equal to the three starting credits, minus the four removed, plus the three unused and returned credits.

Referring now to FIGS. 2B and 2C, the process of correctly setting the credit counter 34 will now be explained with respect to a number of entries read and removed from the FIFOS 22 and 24. One entry 40 is read and removed from FIFO 1 22, and two entries 46 and 50 are read and removed from FIFO 2 24. Although three entries 40, 46 and 50 are removed, the entry 40 removed from FIFO 1 22 does not increase the available space in the fullest FIFO 24, so no credit should be released by the removal of this entry 40. The two removed entries 46 and 50 do increase the available space in the fullest FIFO 24, so two credits should be released, making a total of four credits available.

The calculation of unused credits to return for added entries and credits to release for removed entries is combined into one operation, by treating the removal of an entry from one FIFO as an addition of an entry to the other FIFO. In one exemplary operation, the credit counter 34 is decremented by the total number of new entries transmitted from the source 12 to the destination 14. The router/credit controller 32 calculates the number of credits to release, based on both newly added entries and removed entries. The number of credits to release is transmitted back to the source 12 so the credit counter 34 may be incremented.

Data transfer operations in the exemplary system 10 are divided into cycles, wherein one or more entries may be added and/or removed from the FIFOS 22 and 24, and the credit counter 34 is updated according to those entries by decrementing and incrementing for transmitted and released credits, respectively. The read and write operations illustrated in FIGS. 2A-2C may all occur in a single cycle.

Again, the mechanism for incrementing and decrementing the credit counter 34 may be implemented in any suitable manner, and may be controlled either by the source 12, destination 14, a combination thereof, or an external component (not shown). In the exemplary system 10, the source 12 is configured to transfer no more than a predetermined maximum number of entries in one cycle, based on how many entries the destination 14 can process simultaneously. The storage devices may have any number of input and output ports. In the exemplary embodiment illustrated in FIGS. 2A-2C, the FIFOS 22 and 24 each have at least four input ports for storing multiple entries simultaneously, and two output ports for reading multiple entries simultaneously. The source 12 would therefore have been configured to transmit no more than four entries per cycle (e.g., 74, 76, 80 and 84), in case all four entries were sent to a single FIFO (e.g., 22).

In alternative embodiments, simultaneous transmission of multiple entries may be handled in any other suitable manner, such as queuing up entries for storage one by one in a single cycle into a single input port on a storage device, etc. The system 10 described herein is purely exemplary, and the method and apparatus for controlling the flow of data to a pair of storage devices is not limited to this configuration. For example, entries may be transmitted on a parallel or serial bus, storage devices are not limited to any particular type of memory, the credit controller need not be combined with the router, etc. Although two consumers 26 and 30 are shown in the destination 14, the data from the storage devices 22 and 24 may be used in any desired fashion. The storage devices 22 and 24 need not have the same width or depth. It may be advantageous in some systems to have different size storage devices, if one of the storage devices is expected to receive more entries than the other. Other adaptations may be made along these lines to the method and apparatus for controlling the flow of data to a pair of storage devices without departing from the scope of the inventive concepts disclosed herein.

Figure 3:
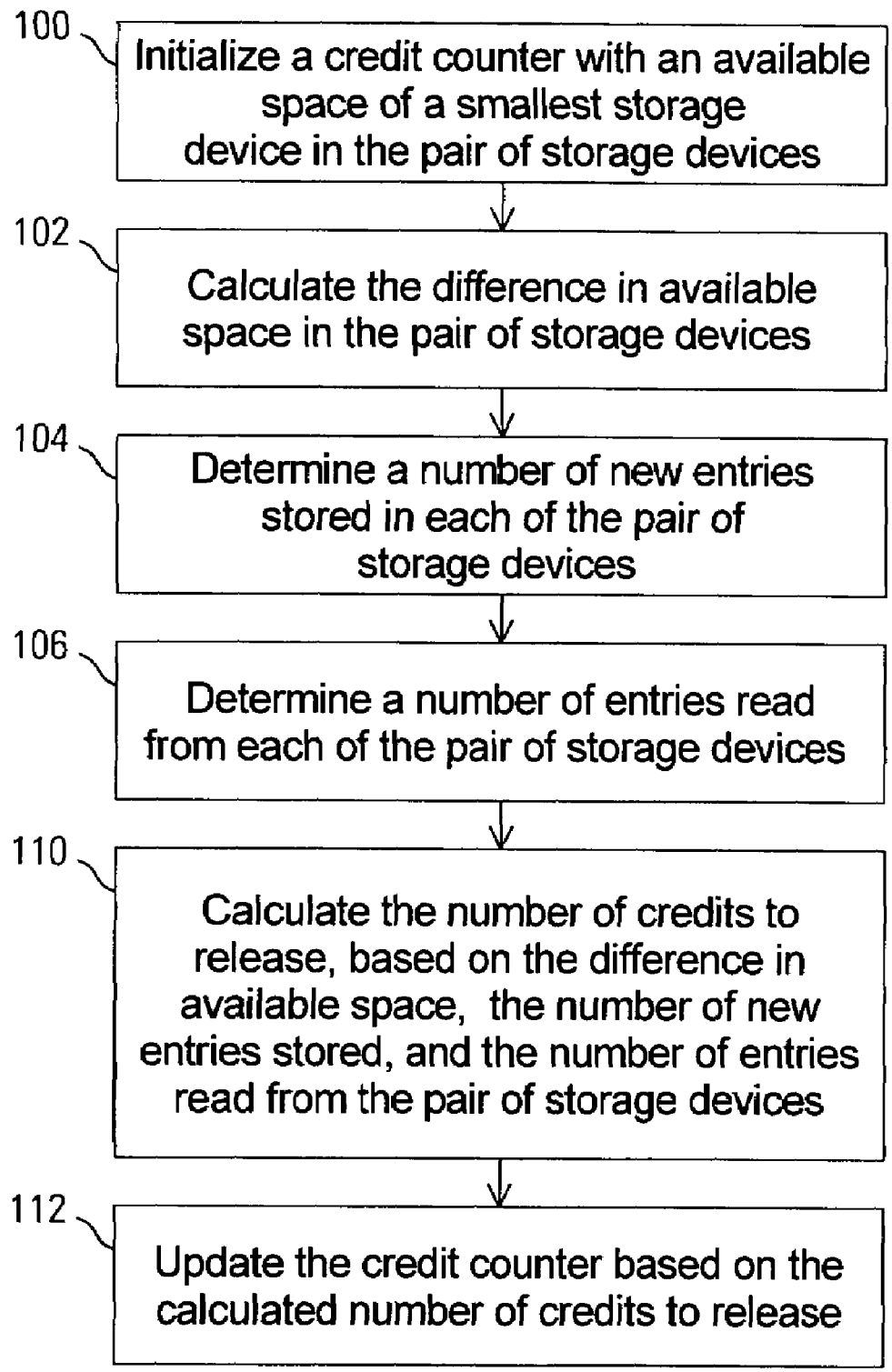
FIG. 3 is a flow chart of an exemplary operation for controlling the flow of data to a pair of storage devices using a single credit counter based on read and write transactions.

Referring now to FIG. 3, an exemplary process of controlling data flow to a pair of storage devices will be summarized. A credit counter is initialized 100 with an available space of a smallest storage device in the pair of storage devices. The difference in available space in the storage devices before the at least one new entry is calculated 102. The number of entries added to each storage device is determined 104, and the number of entries removed from each storage device is also determined 106. The number of credits to release is calculated 110, based on the difference in available space, the number of new entries stored, and the number of entries read (and removed) from the pair of storage devices. The credit counter is updated 112 based on the calculated number of credits to release.

The calculation of the difference in available space may be performed in a variety of manners. For example, the number of empty slots in one storage device may be subtracted from that of the other. Alternatively, the number of entries in one storage device may be subtracted from that of the other. In this embodiment, if the storage devices have different capacities, the number of entries in the larger storage device should be normalized to that of the smaller storage device. These various approaches to calculating the available space of the storage devices should be viewed as equivalent, because they are merely different ways of calculating the same quantity, from various points of view. Thus, a storage device may be equivalently referred to as having less available space or as being more-full with respect to the other storage device.

The difference in available space should be calculated based on the state of the storage devices at the beginning of a cycle, so that the calculated difference is not changed by the read and write operations taking place during the cycle until the calculation of credits to release is complete. In other words, although the difference in available space is changed by the read and write operations, the calculated difference used while calculating the credits to release is based on the initial state of the storage devices at the beginning of the cycle. In one exemplary embodiment, this may be ensured by performing read and write operations simultaneously so that the difference in the entries used remains constant through the read and write operations.

Figure 4:
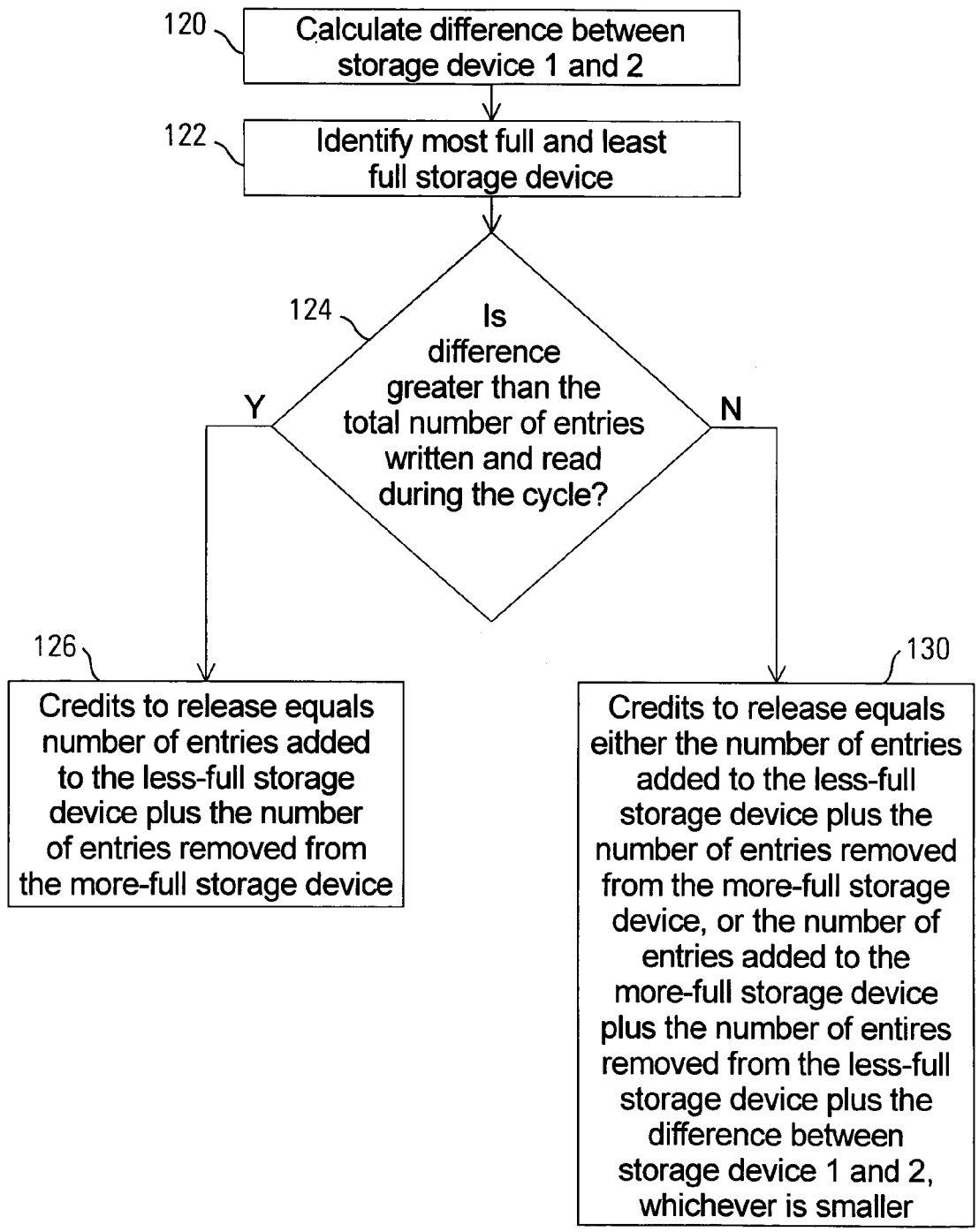
FIG. 4 is a flow chart of an exemplary operation for calculating the number of credits to release for a read and write transaction.

An exemplary operation for calculating the number of credits to release is summarized in the flow chart of FIG. 4. The difference between storage devices such as FIFOS 22 and 24 is calculated 120, before the addition or removal of entries in a given cycle. As discussed above, this may be performed in any suitable manner. For example, the difference may be indicated in terms of free space or the number of entries. The most full and least full storage devices are identified 122 in the pair of storage devices. If 124 the difference is greater than the total number of entries written to and read from both storage devices during the cycle, the number of credits to release is set 126 to the number of entries added to the less-full storage device plus the number of entries removed from the more-full storage device. If 124 the difference is not greater, the number of credits to release is set 130 to either the number of entries added to the less-full storage device plus the number of entries removed from the more-full storage device, or the number of entries added to the more-full storage device plus the number of entries removed from the less-full storage device plus the difference between storage device 1 and 2, whichever is smaller.

In an alternative embodiment, the difference is compared (in element 124) with the total number of ports on the storage device having more ports, rather than the total number of entries written to and read from both storage devices. In this alternative embodiment, if the difference is greater than the total number of ports on the storage device having more ports, the number of credits to release is set 126 to the number of entries added to the less-full storage device plus the number of entries removed from the more-full storage device. As before, if the difference is not greater, the number of credits to release is set 130 to either the number of entries added to the less-full storage device plus the number of entries removed from the more-full storage device, or the number of entries added to the more-full storage device plus the number of entries removed from the less-full storage device plus the difference between storage device 1 and 2, whichever is smaller.

Figure 5:
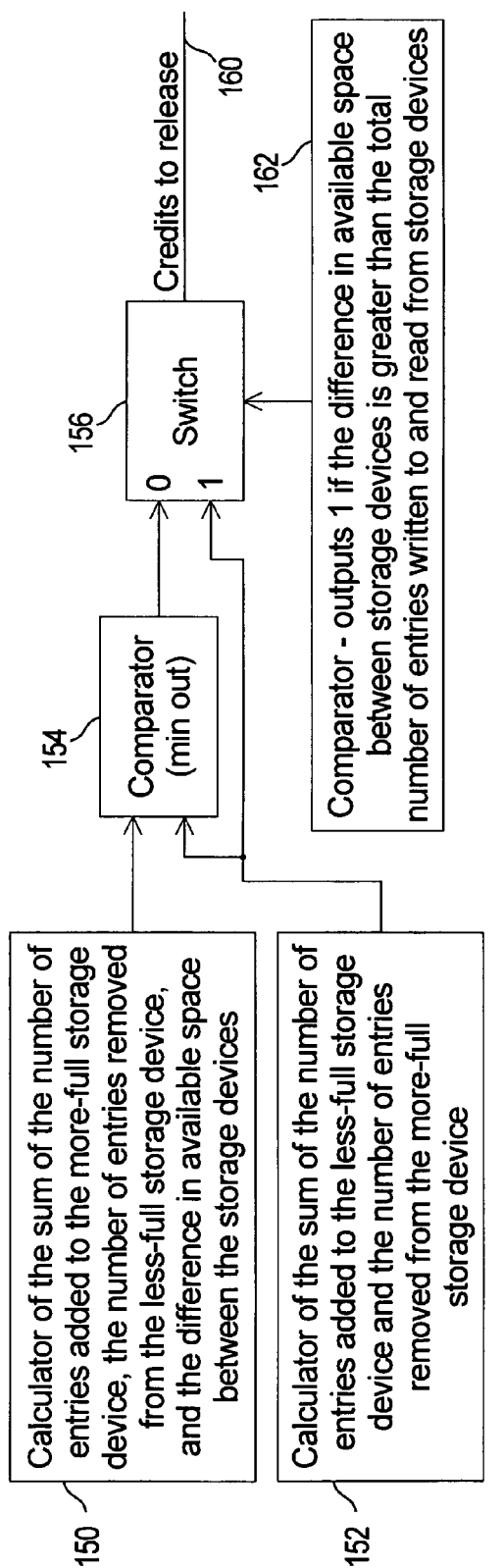
FIG. 5 is a block diagram of an exemplary apparatus for controlling data flow between a source and a destination by calculating the number of credits to release during a read and write data transaction.

Referring now to FIG. 5, a block diagram of an exemplary apparatus is illustrated that calculates the number of credits to return for data transactions in one cycle. The apparatus includes a calculator 150 that calculates the sum of the number of entries added to the more-full storage device, the number of entries removed from the less-full storage device, and the difference in available space between the storage devices. Another calculator 152 calculates the sum of the number of entries added to the less-full storage device and the number of entries removed from the more-full storage device. The outputs of these two calculators 150 and 152 are connected to the two inputs of a comparator 154, which examines the results of these two calculators 150 and 152 and outputs the lesser of the two results. The output of the comparator 154 is connected to one of two inputs of a switch 156, and the output of the calculator 152 is also connected to the other of the two inputs of the switch 156. The switch 156 outputs either the output of the comparator 154 or the output of the calculator 152. The output of this switch 156 carries the number of credits to release 160 for read and write operations during the cycle. The switch 156 is actuated by a comparator 162 which compares the difference in available space in the storage devices with the total number of entries written to and read from the storage devices during one cycle. If the difference is greater than the number of entries written and read, the switch 156 sets the number of credits to release 160 equal to the output of the first calculator 150. If the difference is not greater, the switch 156 sets the number of unused credits 160 equal to the output of the second calculator 152.

Again, in an alternative embodiment, the difference in available space may be compared with the total number of ports on the storage device having more ports, rather than with the total number of entries written to and read from the storage devices during one cycle.

Figure 6:
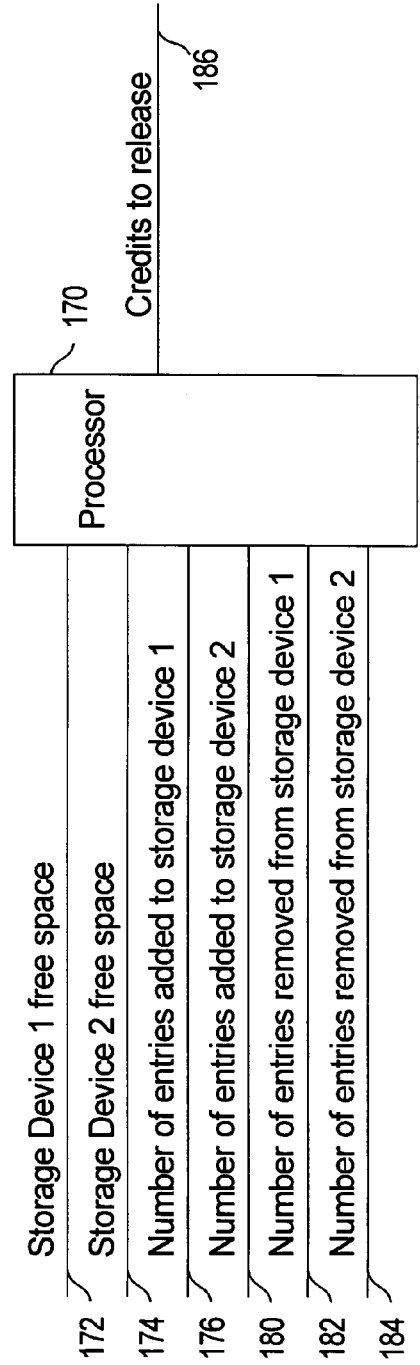
FIG. 6 is a block diagram of an exemplary processor-based apparatus for controlling data flow between a source and a destination by calculating the number of credits to release during a read and write data transaction.

In another exemplary embodiment illustrated in FIG. 6, the number of credits to return is calculated by a processor 170 executing software such as embedded firmware. A number of inputs are provided to the processor 170, such as a measure 172 and 174 of the free space in the first and second storage devices, the number 176 and 180 of new entries received for each storage device, and the number 182 and 184 of entries removed from each storage device. The processor 170 calculates the number of credits used, using an algorithm such as that illustrated in the flowchart of FIG. 4 or in the pseudo-code below, providing the number at an output 186 which may be used to update a credit counter.

An exemplary embodiment of the algorithm for calculating the number of credits to release, which may be executed by a processor 170 such as that illustrated in FIG. 6, is outlined in the following pseudo-code:

```
Compute the difference in the number of used entries
    between the FIFOS in the current cycle
If the difference is greater than the number of entries
    written to and read from the FIFOS
{
    The number of credits to release is equal to the number
        of entries added into the less-full FIFO + the
        number of entries removed from the more-full FIFO
}
else
{
    The number of credits to release is equal to the
        minimum of
    1)   The number of entries added to the less-full
         FIFO + the number of entries removed from the
         more-full FIFO
    2)   The number of entries added to the more-full
         FIFO + the number of entries removed from the
         less-full FIFO + the difference between the number
         of entries used in each FIFO in the current cycle
}
```

In an alternative exemplary embodiment, the difference is compared with the total number of ports on the FIFO having more ports, as in the following pseudo-code:

```
Compute the difference in the number of used entries
    between the FIFOS in the current cycle
If the difference is greater than the number of ports on
    the FIFO with more ports
{
    The number of credits to release is equal to the number
        of entries added into the less-full FIFO + the
        number of entries removed from the more-full FIFO
}
else
{
    The number of credits to release is equal to the
        minimum of
    1)   The number of entries added to the less-full
         FIFO + the number of entries removed from the
         more-full FIFO
    2)   The number of entries added to the more-full
         FIFO + the number of entries removed from the
         less-full FIFO + the difference between the number
         of entries used in each FIFO in the current cycle
}
```

Now that the method and apparatus for controlling the flow of data to a pair of storage devices has been described generally, including various alternative embodiments, an exemplary embodiment will be described in more detail. In this exemplary embodiment, the pair of storage devices is a pair of FIFOS of equal depth. An electrical circuit 200 illustrated in FIG. 7 will be described for calculating the number of credits to release for data transactions in one cycle. The circuit 200 determines which of the FIFOS is more full and which is less full, with the more-full FIFO labeled M and the less-full FIFO labeled L. When the FIFOS have an equal amount of free space, it does not matter which is designated M and which is L, and the circuit should be designed to designate one of the FIFOS as M by default.

The circuit 200 uses a number of inputs. A FIFO_1_Total_Used signal 202 and a FIFO_2_Total_Used signal 204 indicate the number of entries in the FIFOS at the beginning of the cycle. A FIFO_1_In signal 206 and a FIFO_2_In signal 210 indicate the number of new entries written to the FIFOS during the cycle. A FIFO_1_Out signal 212 and a FIFO_2_Out signal 214 indicate the number of entries removed from the FIFOS during the cycle. Finally, a FIFO_Ports signal 216 indicates the total number of input and output ports on the FIFO with more ports. For example, if FIFO 1 has two input ports and one output port, and FIFO 2 has two input ports and two output ports, FIFO_Ports 216 would be four, based on the total number of input and output ports on FIFO 2. The number of entries written to or read from either FIFO during one cycle may be any number from 0 up to the number of input or output ports, respectively, on the FIFO.

A subtraction element 220 produces the Used_Diff signal 222 by subtracting one input, FIFO_2_Total_Used 204, from the other, FIFO_1_Total_Used 202. In other words, in this embodiment, the difference between the two FIFOS is calculated by subtracting the number of entries in one from the other. Note that the Used_Diff signal 222 will be negative if FIFO_2_Total_Used 204 is greater than FIFO_1_Total_Used 202, and positive otherwise. The subtraction element 220 also produces a Used_Diff_Sign signal 224 indicating whether the Used_Diff signal 222 is positive or negative. Thus, the Used_Diff signal 222 itself simply indicates the magnitude or absolute value of the difference between the FIFOS, and the Used_Diff_Sign signal 224 indicates whether the Used_Diff signal 222 is positive or negative. For example, the Used_Diff_Sign signal 224 may comprise the most significant bit of a 2's complement Used_Diff signal 222, having a value of 1 if it is negative, and 0 if it is positive or if the number of entries in the FIFOS was equal. The Used_Diff_Sign signal 224 is used to identify L and M, the less-full and more-full FIFOS.

The FIFO_2_In signal 210 is added to the FIFO_1_Out signal 212 in an adder 226. The FIFO_1_In signal 206 is added to the FIFO_2_Out signal 214 in another adder 230. A switch such as a multiplexer 232 is used to generate the L_In_M_Out signal 240, which carries the sum of the number of entries made to the less-full FIFO and the number of entries removed from the more-full FIFO. In the exemplary circuit 200, all switches are implemented using multiplexers having two data inputs, a data output, and a selector input. The output 234 of the adder 226 and the output 236 of the adder 230 are connected to the two inputs of the multiplexer 232, and the Used_Diff_Sign signal 224 is connected to the selector input of the multiplexer 232. The L and M FIFOS are thus identified using the sign of the difference in the number of entries in the FIFOS as the selector input for the multiplexer 232. The output of the multiplexer 232 carries the L_In_M_Out signal 240.

The M_In_L_Out signal 242, which carries the sum of the number of entries made to the more-full FIFO and the number of entries removed from the less-full FIFO, is generated at the output of another multiplexer 244. The output 234 of the adder 226 and the output 236 of the adder 230 are connected to the two inputs of the multiplexer 244, and the Used_Diff_Sign signal 224 is connected to the selector input of the multiplexer 244. The adder outputs 234 and 236 are connected to the multiplexer 244 inputs in the opposite order from their connections to the multiplexer 232. For example, if output 234 were connected to the first input of multiplexer 232, output 234 would be connected to the second input of multiplexer 244. The output of multiplexer 244 therefore carries the M_In_L_Out signal 242.

The difference in the number of entries (Used_Diff 222) is added to the M_In_L_Out signal 242 in an adder 246, creating the M_In_L_Out Diff signal 250. The L_In_M_Out signal 240 and the M_In_L_Out_Diff signal 250 are connected to the two inputs of a comparator 252, which carries the smaller of the two inputs at its output 254. A multiplexer 256 generates the result signal 260 indicating the number of credits to release. The L_In_M_Out signal 240 is connected to one input of the multiplexer 256, and the output 254 of the comparator 252 is connected to the other input of the multiplexer 256. The selector input of the multiplexer 256 is connected to a comparator 262 which compares the Used_Diff signal 222 with the FIFO_Ports signal 216. If the difference between the FIFOS, indicated by the Used_Diff signal 222, is greater than the total number of ports on the FIFO with more ports, indicated by the FIFO_Ports signal 216, the multiplexer 256 sets the credits to release 260 to the sum of the entries added to the less-full FIFO and the entries removed from the more-full FIFO, indicated by the L_In_M_Out signal 240. If the difference is not greater, the multiplexer 256 sets the credits to release 260 to the output 254 of the comparator 252, the minimum of the L_In_M_Out signal 240 and the M_In_L_Out_Diff signal 250. In other words, the output of the comparator 262 is asserted if Used_Diff 222 is greater than FIFO_Ports 216. In an alternative embodiment, the comparator 256 is asserted if Used_Diff 222 is greater than or equal to FIFO_Ports 216.

Because the number of entries in the FIFOS is normalized by calculating the difference in available space between the FIFOS (see Used_Diff 222), the number of bits for each signal throughout much of the circuit 200 can be minimized. This enables the circuit 200 to be based on the number of inputs and outputs (FIFO_1_In 206, FIFO_2_In 210, FIFO_1_Out 212 and FIFO_2_Out 214), rather than the total number of entries in each FIFO, which would require more bits and wider data paths. Only enough bits required to represent the maximum number of entries added and removed in one cycle need be carried through most parts of the circuit 200, because the difference in entries or free space between the FIFOS is normalized.

Figure 7:
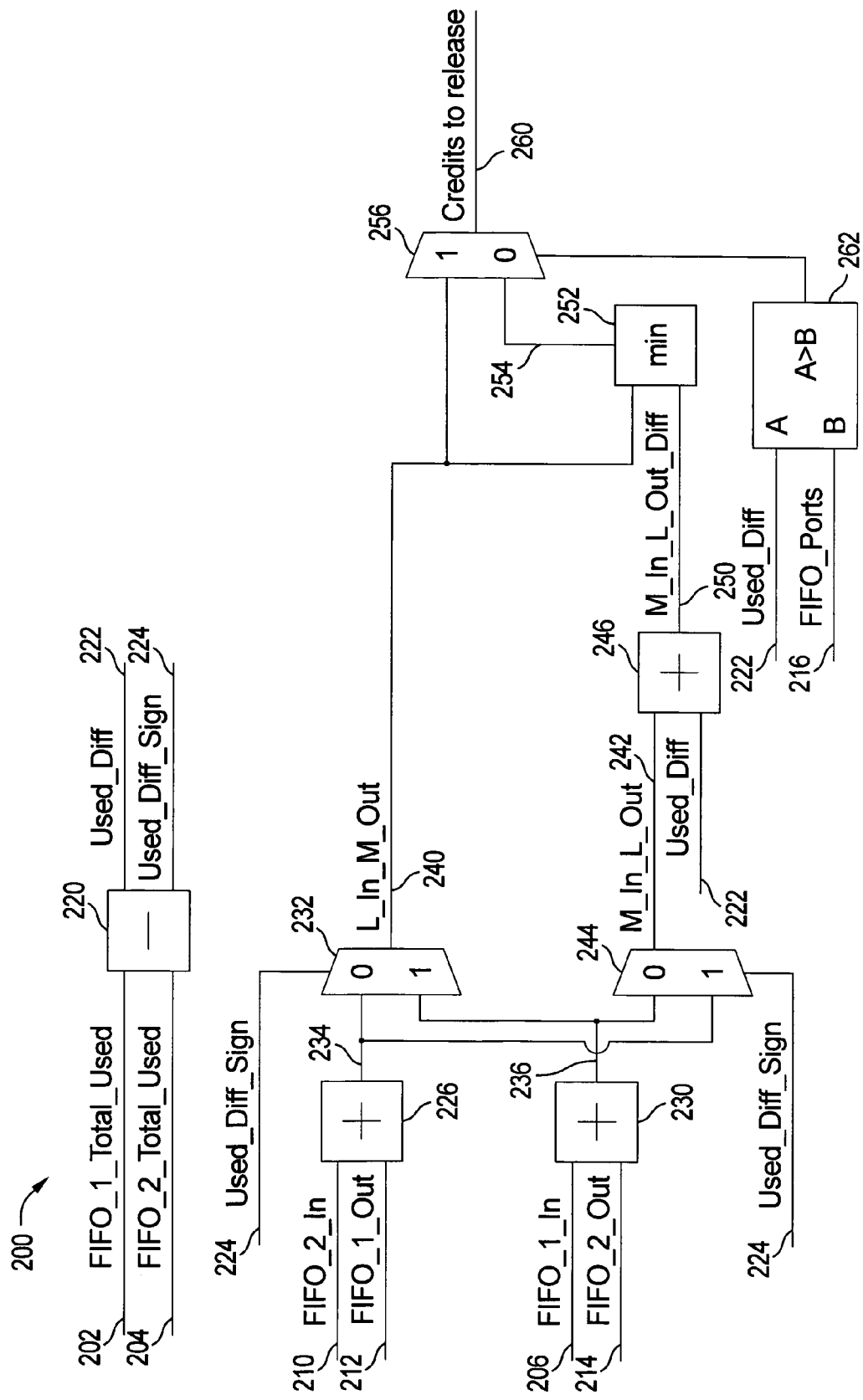
FIG. 7 is an exemplary circuit for controlling data flow between a source and a destination by calculating the number of credits to release during a read and write data transaction.

In the exemplary embodiment illustrated in FIG. 7, each FIFO is 120 data slots deep, so the FIFO_1_Total_Used signal 202 and FIFO_2_Total_Used signal 204 each have seven bits. A seven bit binary number can store up to the number 127, which is sufficient to represent the number of entries in a FIFO with 120 data slots. The Used_Diff signal 222 also has seven bits, and the Used_Diff_Sign signal 224 has one bit.

The number of bits in FIFO_1_In 206, FIFO_2_In 210, FIFO_1_Out 212 and FIFO_2_Out 214 may be greatly reduced from that in the subtraction element 220 by normalizing the number of entries in the FIFOS in the subtraction element 220. The FIFOS each have two input and two output ports, so only four entries may be added and four removed per cycle. FIFO_1_In 206, FIFO_2_In 210, FIFO_1_Out 212 and FIFO_2_Out 214 each have two bits, enabling them to carry values up to two, the largest possible number of inputs or outputs per FIFO in this exemplary embodiment. The L_In_M_Out signal 240 and M_In_L_Out signal 242 each have three bits because they carry values from zero to four based on the number of input and output ports in the FIFOS.

The M_In_L_Out_Diff signal 250 may either have enough bits to carry the maximum value of the M_In, L_In and Used_Diff 222 signals, or may be reduced to three bits because the minimum value of L_In_M_Out 240 and M_In_L_Out_Diff 250 will not exceed four, the maximum value of L_In_M_Out 240. Additional circuitry may be needed if M_In_L_Out_Diff signal 250 is reduced to three bits, ensuring that if the value of the Used_Diff 222 signal is large, the M_In_L_Out_Diff 250 signal does not erroneously appear smaller than L_In_M_Out 240 due to truncation errors.

The output of comparator 252 and the result signal 260 indicating the number of credits to release each have three bits, enabling them to carry the maximum possible value of four for this exemplary embodiment.

The number of bits required in signals throughout the circuit 200 scales up with the maximum number of entries that can be added and removed in one cycle, which in this case is set by the number of input and output ports per FIFO at four. This normalization of the difference between the FIFO contents provides a great benefit by reducing the size of the circuit 200 and ensuring that it scales up slowly. If the difference were not normalized, the number of bits needed throughout the circuit 200 would scale up with the depth of the FIFOS. However, by normalizing the difference, only the difference calculation portion 220 of the circuit 200 is dependent upon the FIFO depth and scales up accordingly, and the remainder of the circuit 200 scales up according to the $\log_2$ of the maximum number of entries added and removed per cycle.

Figure 8:
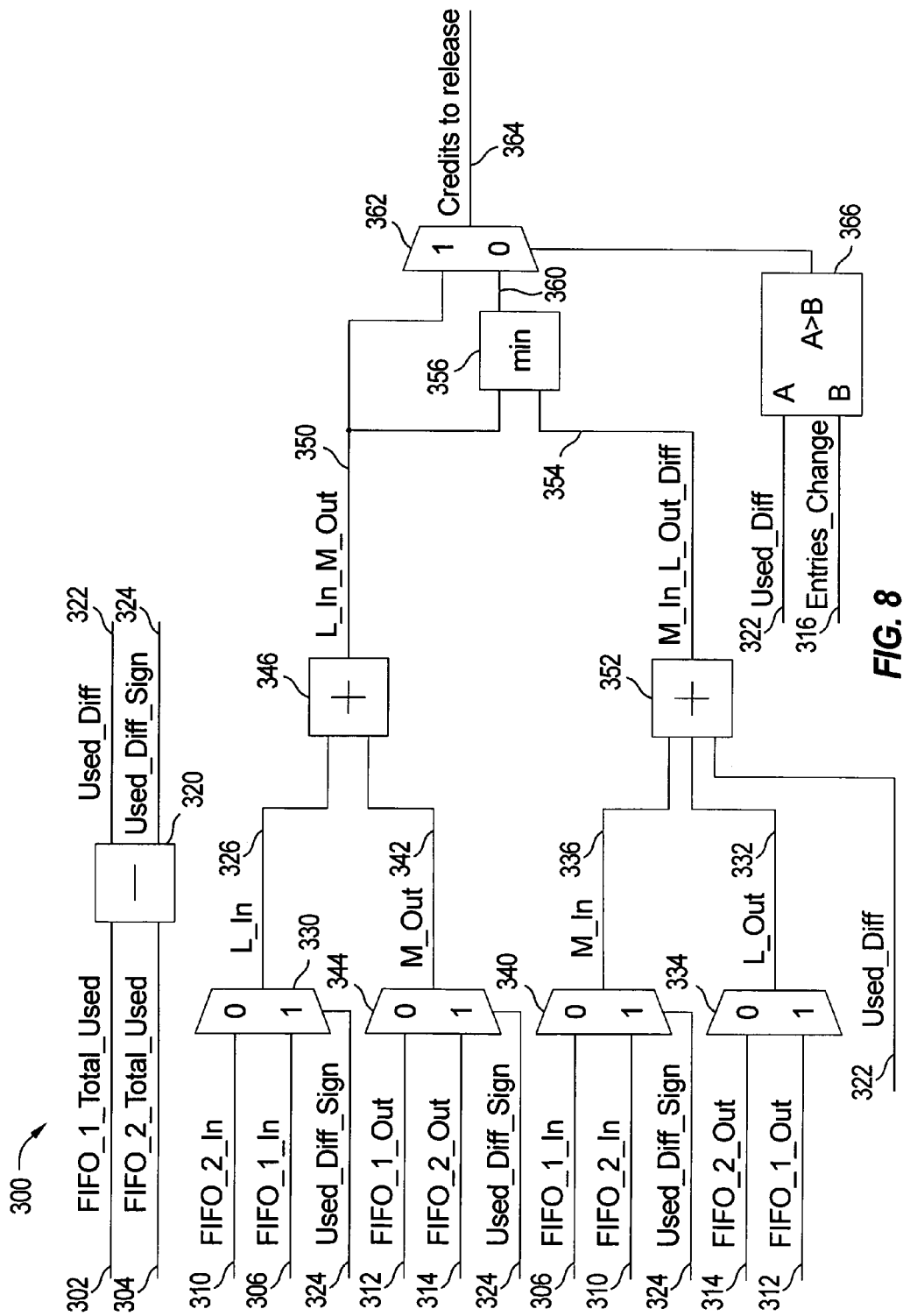
FIG. 8 is another exemplary circuit for controlling data flow between a source and a destination by calculating the number of credits to release during a read and write data transaction.

The algorithm used by the method and apparatus for controlling the flow of data to a pair of storage devices is not limited to any particular layout or configuration. For example, another embodiment may be implemented in the exemplary electrical circuit 300 illustrated in FIG. 8. In this embodiment, the identification of the less-full FIFO L and the more-full FIFO M are performed before adding the various values, in contrast to the exemplary electrical circuit 200 of FIG. 7.

The circuit 300 uses the same inputs as the previously described circuit 200, including: FIFO_1_Total_Used 302, FIFO_2_Total_Used 304, FIFO_1_In 306, FIFO_2_In 310, FIFO_1_Out 312 and FIFO_2_Out 314. In this exemplary embodiment, the total number of entries written to or read from the FIFOS, Entries_Change 316, is used in place of the total number of ports on the FIFO with more ports (see FIFO_Ports 216, FIG. 7). Entries_Change 316 may be derived by adding FIFO_1_In 306, FIFO_2_In 310, FIFO_1_Out 312 and FIFO_2_Out 314. A subtraction element 320 produces Used_Diff 322 by subtracting FIFO_2_Total_Used 304 from FIFO_1_Total_Used 302. The subtraction element 320 also produces Used_Diff_Sign 324 indicating whether Used_Diff 322 is positive or negative.

In this embodiment, Used_Diff_Sign 324 is used to identify L and M, the less-full and more-full FIFOS, before adding them. L_In 326, the number of entries added to the less-full FIFO, is identified by multiplexer 330. FIFO_1_In 306 and FIFO_2_In 310 are connected to the two inputs of the multiplexer 330, and Used_Diff_Sign 324 is connected to the selector input of the multiplexer 330, so that L_In 326 is connected to FIFO_1 In 306 if FIFO 2 has more entries than FIFO 1, and is otherwise connected to FIFO_2_In 310.

Similarly, L_Out 332, the number of entries removed from the less-full FIFO, is identified by multiplexer 334. FIFO_1_Out 312 and FIFO_2_Out 314 are connected to the two inputs of the multiplexer 334, and Used_Diff_Sign 324 is connected to the selector input of the multiplexer 334, so that L_Out 332 is connected to FIFO_1_Out 312 if FIFO 2 has more entries than FIFO 1, and is otherwise connected to FIFO_2_Out 314.

M_In 336, the number of entries added to the more-full FIFO, is identified by multiplexer 340. FIFO_1_In 306 and FIFO_2_In 310 are connected to the two inputs of the multiplexer 340 in opposite polarity than to multiplexer 330. Used_Diff_Sign 324 is connected to the selector input of the multiplexer 340, so that M_In 336 is connected to FIFO_2_In 310 if FIFO 2 has more entries than FIFO 1, and is otherwise connected to FIFO_1_In 306. M_Out 342, the number of entries removed from the more-full FIFO, is identified by multiplexer 344. FIFO_1_Out 312 and FIFO_2_Out 314 are connected to the two inputs of the multiplexer 344 in opposite polarity than to multiplexer 334. Used_Diff_Sign 324 is connected to the selector input of the multiplexer 344, so that M_Out 342 is connected to FIFO_2 Out 314 if FIFO 2 has more entries than FIFO 1, and is otherwise connected to FIFO_1_Out 312.

L_In 326 and M_Out 342 are each connected to an input of an adder 346, which generates L_In_M_Out 350 at its output. M_In 336, L_Out 332 and Used_Diff 322 are each connected to an input of another adder 352, which generates M_In_L_Out_Diff 354 at its output. L_In_M_Out 350 and M_In_L_Out Diff 354 are each connected to an input of a comparator 356, which carries the smaller of the two inputs at its output 360. This output 360 and L_In_M_Out 350 are each connected to an input of a multiplexer 362, which indicates the number of credits to release at its output 364. The selector input of the multiplexer 362 is connected to the output of a comparator 366 which compares its inputs Used_Diff 322 and Entries_Change 316. If Used_Diff 322 is greater than Entries_Change 316, the multiplexer 362 sets the number of credits to release 364 equal to L_In_M_Out 350. Otherwise, the multiplexer 362 sets the number of credits to release 364 equal to the lesser of L_In_M_Out 350 and M_In_L_Out Diff 354. In an alternative embodiment, the comparator 366 may use a greater-than-or-equal comparison function rather than the greater-than comparison function.

A series of six exemplary data transactions is illustrated in FIGS. 9-14 and will now be described to illustrate the operation of the method and apparatus for controlling the flow of data to a pair of storage devices. The arrows in FIGS. 9-14 represent data entries, with double-lined arrows indicating existing entries and single-lined arrows indicating new entries either added-to or read-from the storage devices. Arrows pointing up indicate existing entries and entries being added to a storage device. Arrows pointing down indicate entries being read (and removed) from a storage device. Note that down arrows are drawn starting from the topmost filled position, so that they end up showing the ending filled level of the storage device. However, depending upon the type of storage device, the entries may be read from any slot of a storage device and in any order. For example, given a FIFO, entries are read from the bottom in serial fashion.

Figure 9:
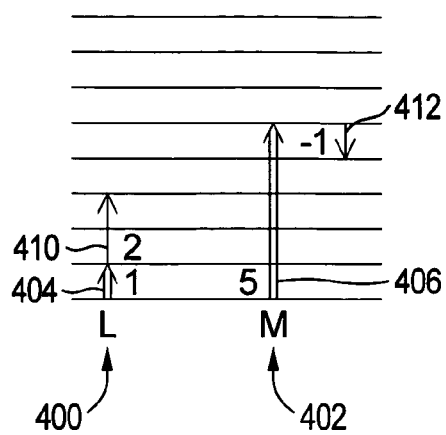
FIGS. 9-14 are illustrations of various combinations of data entries in a pair of exemplary storage devices, showing existing entries, new entries added by a write operation and entries removed by a read operation.

Referring now to FIG. 9, the less-full FIFO 400 contains one existing entry 404, and the more-full FIFO 402 contains five existing entries 406. A data transmission of two new entries 410 is received for storage in the less-full FIFO 400. No new entries are added to the more-full FIFO 402. One entry 412 is read (and removed) from the more-full FIFO 402. At the beginning of the cycle, the credit counter would contain three credits, reflecting the available slots in the more-full FIFO 402. The difference in available space between the FIFOS 400 and 402 is four. L_In_M_Out is 2+1 or 3, and M_In_L_Out_Diff is 0+0+4 or 4. Because the difference (four) is greater than the total change in entries (three), the credits to release is L_In_M_Out, or three. Therefore, if the credit counter began with three credits, two credits were removed for the new entries 410, and three credits are released, so the credit counter ends up with 3−2+3 or 4 credits.

Figure 10:
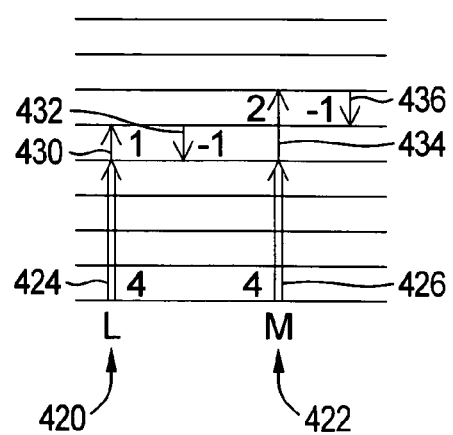

Another example is illustrated in FIG. 10, in which the less-full FIFO 420 and the more-full FIFO 422 each begin with four entries 424 and 426. One new entry 430 is added to the less-full FIFO 420 and one entry 432 is read and removed. Two new entries 434 are added to the more-full FIFO 422 and one entry 436 is read and removed. Four credits are available at the beginning of the cycle, and the difference is zero. L_In_M_Out is 1+1 or 2, M_In_L_Out_ Diff is 2+1+0 or 3 . The difference (zero) is not greater than the total change in entries (five), so the number of credits to release is the lesser of L_In_M_Out and M_In_L_Out_Diff, or two. The credit counter ends up with 4−3+2 or 3.

Figure 11:
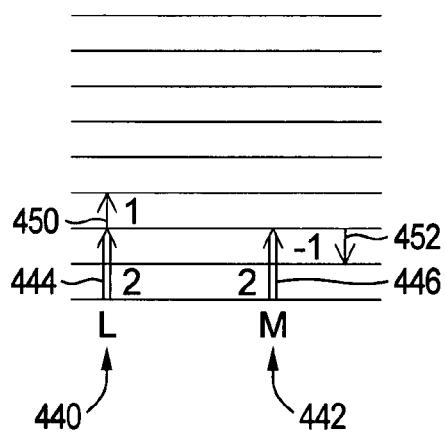

In the example of FIG. 11, the less-full FIFO 440 and the more-full FIFO 442 each begin with two entries 444 and 446. One new entry 450 is added to the less-full FIFO 440, and one entry 452 is removed from the more-full FIFO 442. Six credits are available at the beginning of the cycle, and the difference is zero. L_In_M_Out is 1+1 or 2, M_In_L_Out_Dif is 0+0+0 or 0. The difference (zero) is not greater than the total change in entries (two), so the number of credits to release is the lesser of L_In_M_Out and M_In_L_Out_Diff, or zero. The credit counter ends up with 6−1+0 or 5.

Figure 12:
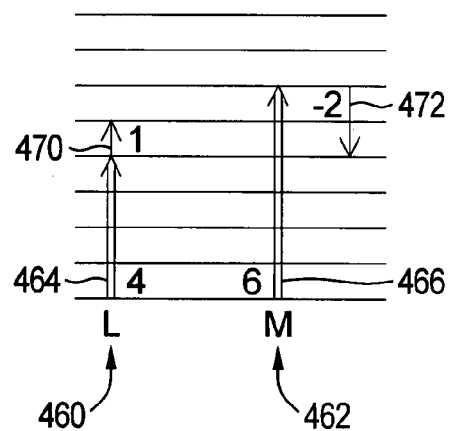

In the example of FIG. 12, the less-full FIFO 460 begins with four entries 464 and the more-full FIFO 462 begins with six entries 466. One new entry 470 is added to the less-full FIFO 460, and two entries 472 are removed from the more-full FIFO 462. Two credits are available at the beginning of the cycle, and the difference is two. L_In_N_Out is 1+2 or 3, M_In_L_Out_Diff is 0+0+2 or 2. The difference (two) is not greater than the total change in entries (three), so the number of credits to release is the lesser of L_In_N_Out and M_In_L_Out_Diff, or two. The credit counter ends up with 2−1+2 or 3. At the end of the cycle, the less-full FIFO becomes the more-full FIFO.

Figure 13:
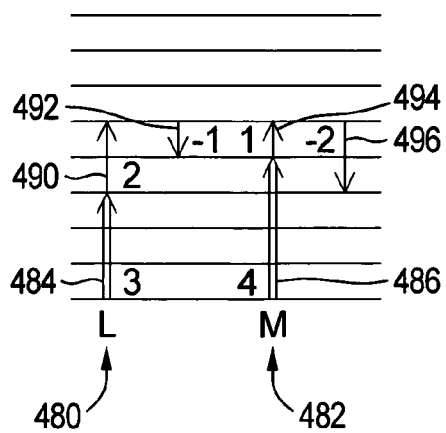

In the example of FIG. 13, the less-full FIFO 480 begins with three entries 484 and the more-full FIFO 482 begins with four entries 486. Two new entries 490 are added to the less-full FIFO 480, and one entry 492 is removed. One new entry 494 is added to the more-full FIFO 482, and two entries 496 are removed. Four credits are available at the beginning of the cycle, and the difference is one. L_In_M_Out is 2+2 or 4, M_In_L_Out_Diff is 1+1+1 or 3. The difference (one) is not greater than the total change in entries (six), so the number of credits to release is the lesser of L_In_M_Out and M_In_L_Out_Diff, or three. The credit counter ends up with 4−3+3 or 4.

Figure 14:
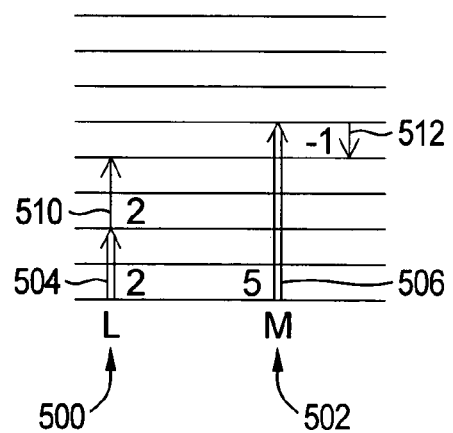

In the example of FIG. 14, the less-full FIFO 500 begins with two entries 504 and the more-full FIFO 442 begins with five entries 506. Two new entries 510 are added to the less-full FIFO 500, and one entry 512 is removed from the more-full FIFO 502. Three credits are available at the beginning of the cycle, and the difference is three. L_In_M_Out is 2+1 or 3, M_In_L_Out_Diff is 0+0+3 or 3. The difference (three) is not greater than the total change in entries (three), so the number of credits to release is the lesser of L_In_M_Out and M_In_L_Out_Diff, or three. The credit counter ends up with 3−2+3 or 4. Note this example illustrates that the comparison function (e.g., in comparator 262 or 366) used to select the final number of credits to release could be either "greater-than" or "greater-than-or-equal" without changing the number of credits to release.

The method and apparatus described herein controls the flow of data to a pair of storage devices using a small and efficient circuit and/or storage registers, greatly reducing the effect of the depth of the storage devices on the apparatus.

An exemplary embodiment of the an apparatus for calculating the number of credits to release for a data transaction in a pair of storage devices may comprise computer readable program code stored on at least one computer readable medium for execution in a processor (e.g., 170) such as that illustrated in FIG. 6. The exemplary computer readable program code includes code for calculating a difference in free space between a storage device with less free space and a storage device having more free space, and code for calculating a first sum of a number of entries added to the storage device having more free space and a number of entries removed from the storage device having less free space. The computer readable program code also includes code for calculating a second sum of a number of entries added to the storage device having less free space and a number of entries removed from the storage device having more free space and the difference. The computer readable program code also includes code for setting the number of credits to release to the first sum if the difference is greater than a total number of entries written to and read from the pair of storage devices, and code for setting the number of credits to release to a minimum of said the sum and the second sum if the difference is not greater than the total number entries written to and read from the pair of storage devices.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method for controlling data flow to storage devices, the method comprising:
   determining a number of entries added to each of a pair of storage devices;
   determining a number of entries removed from each of said pair of storage devices;
   calculating a difference in available space between said pair of storage devices;
   calculating a number of credits to release based on said numbers of entries added to each of said pair of storage devices, on said numbers of entries removed from each of said pair of storage devices, and on said difference in available space;

updating a credit counter based on said number of credits to release; and controlling a flow of data to said pair of storage devices based on a state of said credit counter.

2. The method of claim 1, wherein each of said number of entries removed from one of said pair of storage devices is treated as an entry added to another of said pair of storage devices during said calculating said number of credits to release.

3. The method of claim 1, further comprising initializing said credit counter with an available space of a smallest storage device in said pair of storage devices.

4. The method of claim 3, said updating comprising decrementing said credit counter by said number of entries added.

5. The method of claim 3, said updating comprising incrementing said credit counter by said number of credits to release.

6. The method of claim 1, said calculating said difference comprising subtracting a number of existing entries in a first of said pair of storage devices from a number of existing entries in a second of said pair of storage devices.

7. The method of claim 1, said calculating said difference comprising subtracting a number of empty slots in a first of said pair of storage devices from a number of empty slots in a second of said pair of storage devices.

8. The method of claim 1, said calculating said number of credits to release further comprising determining which of said pair of storage devices has more free space and which has less free space.

9. The method of claim 8, said calculating said number of credits to release further comprising calculating a first sum of said number of entries added to said storage device having more free space plus said number of entries removed from said storage device having less free space.

10. The method of claim 9, said calculating said number of credits to release further comprising calculating a second sum of said number of entries added to said storage device having less free space plus said number of entries removed from said storage device having more free space plus said difference.

11. The method of claim 10, wherein said number of credits to release is set equal to said first sum if said difference is greater than a total number of input ports and output ports on whichever of said pair of storage devices has more total input and output ports.

12. The method of claim 10, wherein said number of credits to release is set equal to said first sum if said difference is greater than a total number of entries written to and read from said pair of storage devices during a period upon which said calculating said number of credits to release is based.

13. The method of claim 10, wherein said number of credits to release is set equal to said first sum when said difference is not less than a total number of entries written to and read from said pair of storage devices.

14. The method of claim 10, wherein said number of credits to release is set equal to said second sum when said second sum is not greater than said first sum and said difference is not greater than a total number of entries written to and read from said pair of storage devices.

15. An apparatus for calculating data storage credits to release for a pair of storage devices, comprising:

a first adder having a first input receiving a number of entries added to one of said pair of storage devices having less free space and a second input receiving a number of entries removed from one of said pair of storage devices having more free space;

a second adder having a first input receiving a number of entries added to said one of said pair of storage devices having more free space and a second input receiving a number of entries removed from said one of said pair of storage devices having less free space; and a comparator having a first input connected to an output of said first adder, a second input connected to an output of said second adder, and an output carrying an indication of said data storage credits to release for said pair of storage devices.

16. The apparatus of claim 15, wherein said first adder output has a minimum number of bits required to represent a maximum number of entries that can be added to said one of said pair of storage devices having less free space and removed from said one of said pair of storage devices having more free space during one cycle.

17. The apparatus of claim 15, wherein said output carrying said indication of said data storage credits to release has a minimum number of bits required to represent a maximum number of credits that can be released during one cycle.

18. The apparatus of claim 15, further comprising a switch having a first input connected to said comparator output, a second input connected to said second adder output, and an output carrying said indication of said data storage credits to release.

19. The apparatus of claim 18, further comprising a second comparator having a first input receiving a difference in available space between said pair of storage devices and a second input receiving a total number of input and output ports on whichever of said pair of storage devices has more total input and output ports, said switch having a selector input connected to an output of said second comparator, wherein said second comparator output causes said switch to select said second input of said switch when said first input of said second comparator is greater than said second input of said second comparator.

20. The apparatus of claim 18, further comprising a second comparator having a first input receiving a difference in available space between said pair of storage devices and a second input receiving a total number of entries written to and read from said pair of storage devices, said switch having a selector input connected to an output of said second comparator, wherein said second comparator output causes said switch to select said second input of said switch when said first input of said second comparator is greater than said second input of said second comparator.

21. The apparatus of claim 15, said first adder further comprising a third input receiving a difference in available space between said pair of storage devices.

22. The apparatus of claim 15, further comprising a third adder between said first adder and said comparator, said third adder comprising a first input connected to said first adder output, a second input receiving a difference in available space between said pair of storage devices, and an output connected to said first input of said comparator.

23. The apparatus of claim 15, wherein said pair of storage devices comprise first-in first-out memories.

24. An apparatus for calculating a number of credits to release for a data transaction in a pair of storage devices, comprising:

a. at least one physical computer readable medium; and
b. computer readable program code stored on said at least one physical computer readable medium, said computer readable program code comprising:
   i. code for calculating a difference in free space between a storage device with less free space and a storage device having more free space;
   ii. code for calculating a first sum of a number of entries added to said storage device having more free space and a number of entries removed from said storage device having less free space;
   iii. code for calculating a second sum of a number of entries added to said storage device having less free space and a number of entries removed from said storage device having more free space and said difference;
   iv. code for setting said number of credits to release to said first sum if said difference is greater than a threshold; and
   v. code for setting said number of credits to release to a minimum of said first sum and said second sum if said difference is not greater than said threshold.

25. The apparatus of claim 24, said threshold comprising a total number of input ports and output ports on whichever of said pair of storage devices has more total input and output ports.

26. The apparatus of claim 24, said threshold comprising a total number of entries written to and read from said pair of storage devices.

* * * * *

UNITED STATES PATENT AND TRADEMARK OFFICE
CERTIFICATE OF CORRECTION

PATENT NO. : 7,330,943 B2
APPLICATION NO. : 11/079548
DATED : February 12, 2008
INVENTOR(S) : Brian W. Hughes It is certified that error appears in the above-identified patent and that said Letters Patent is hereby corrected as shown below:

In column 12, line 63, delete "M_In_L_Out_Dif" and insert -- M_In_L_Out_Diff --, therefor.

In column 13, lines 6-7, delete "L_In_N_Out" and insert -- L_In_M_Out --, therefor.

In column 13, line 10, delete "L_In_N_Out" and insert -- L_In_M_Out --, therefor.

Signed and Sealed this

Tenth Day of June, 2008

JON W. DUDAS
*Director of the United States Patent and Trademark Office*